US008109671B1

(12) United States Patent
Baker et al.

(10) Patent No.: US 8,109,671 B1
(45) Date of Patent: Feb. 7, 2012

(54) CONE SHAPED METAL FOIL GREASE CONTAINER

(76) Inventors: Timothy A. Baker, Broomfield, CO (US); Susan M. Baker, Broomfield, CO (US)

( * ) Notice: Subject to any disclaimer, the term of this patent is extended or adjusted under 35 U.S.C. 154(b) by 845 days.

(21) Appl. No.: 12/215,028

(22) Filed: Jun. 23, 2008

(51) Int. Cl.
*B65D 33/00* (2006.01)
*B65D 33/24* (2006.01)

(52) U.S. Cl. .............................. 383/35; 383/84; 383/907

(58) Field of Classification Search .................... 383/33, 383/34, 35, 84, 86, 907; 4/315, 452, 654, 4/655, 629
See application file for complete search history.

(56) References Cited

U.S. PATENT DOCUMENTS 1,810,806 A * 6/1931 Wilson .......................... 229/400
3,077,410 A * 2/1963 Kanaga ......................... 426/126
3,407,933 A * 10/1968 Klein ........................... 209/447
3,448,915 A * 6/1969 Schwarzkopf .................. 383/37
4,825,915 A * 5/1989 Hess et al. .................... 141/337
4,930,906 A * 6/1990 Hemphill ........................ 383/89
5,356,398 A * 10/1994 Willis ........................... 604/321
5,388,695 A * 2/1995 Gilbert .......................... 206/423
5,661,951 A * 9/1997 Weder ............................ 53/397
5,720,155 A * 2/1998 Weder ............................ 53/397
6,360,485 B1 * 3/2002 Weder et al. ...................... 47/72
6,523,305 B2 * 2/2003 Weder et al. ...................... 47/72
6,581,764 B1 * 6/2003 Hillebrand .................... 206/225
6,871,447 B2 * 3/2005 Weder et al. ...................... 47/72
6,912,810 B2 * 7/2005 Weder .............................. 47/72
6,944,988 B2 * 9/2005 Gilbert ......................... 47/41.01
6,983,563 B2 * 1/2006 Weder .............................. 47/72
2002/0170231 A1 * 11/2002 Weder et al. ...................... 47/72
2003/0115797 A1 * 6/2003 Weder et al. ...................... 47/72
2003/0131529 A1 * 7/2003 Weder .............................. 47/72
2003/0147566 A1 * 8/2003 Brocking ........................ 383/84
2004/0060235 A1 * 4/2004 Weber et al. ...................... 47/72
2004/0074143 A1 * 4/2004 Weder et al. ...................... 47/72
2004/0079029 A1 * 4/2004 Weder .............................. 47/72
2004/0250471 A1 * 12/2004 Weder .............................. 47/72
2006/0037243 A1 * 2/2006 Weder .............................. 47/72

* cited by examiner

*Primary Examiner* — Jes F Pascua

(57) ABSTRACT

A kitchen device in the form of a cone shaped metal foil grease container for receiving and disposing of hot cooking grease. The cone shaped grease container includes a back side, a front side, an open top, downwardly and inwardly sloping edges and a closed bottom. The closed bottom is dimensioned for receipt inside an open top of a garbage disposal for holding the container upright thereon. A portion of the top of the back side of the container includes an upwardly extending flap. The flap, when folded over, is secured to the front side of the container prior to disposing of the grease stored therein.

6 Claims, 2 Drawing Sheets

46
48
48
16
16
10
28
26
29
31
14

16
30
12
10
W1
18
28
L
26

29
31
14
W2
38
22
40
16
10
30
20
18
36
12
18
22
28
31
26
29
32

34

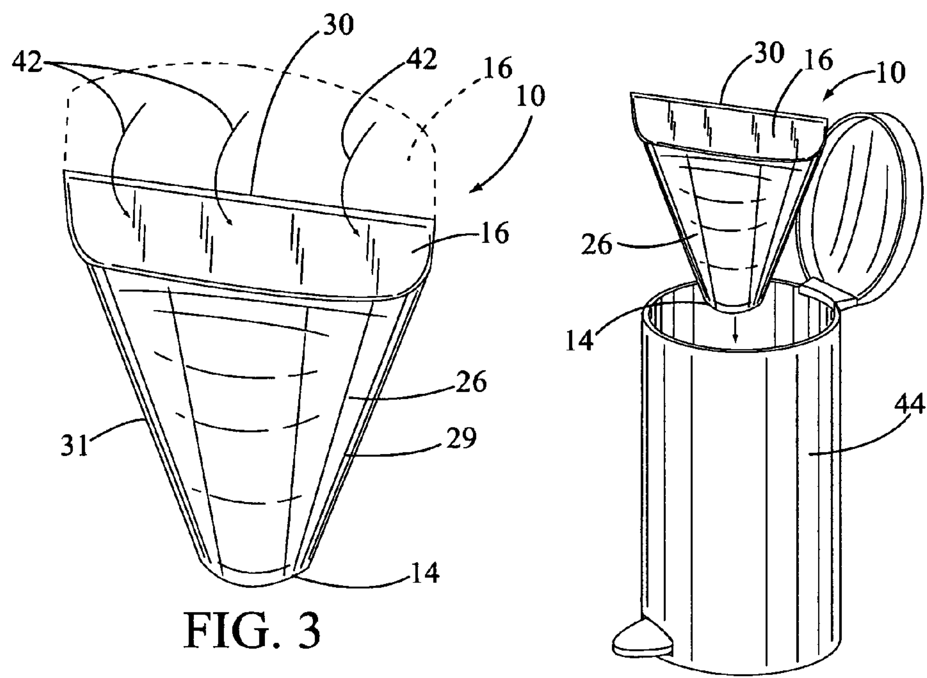
FIG. 3
FIG. 4
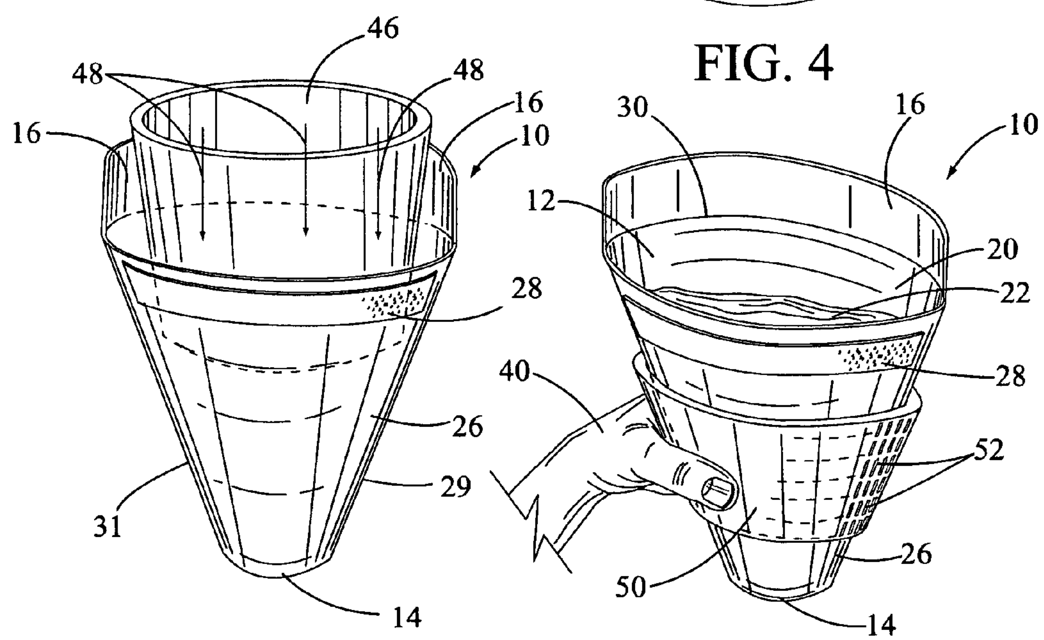
FIG. 5
FIG. 6

CONE SHAPED METAL FOIL GREASE CONTAINER

BACKGROUND OF THE INVENTION (a) Field of the Invention

This invention relates to a container of receiving hot cooking grease in a kitchen and more particularly, but not by way of limitation, to a cone shaped metal foil grease container for receiving and disposing of hot cooking grease. The grease container adapted for receipt inside a top of a garbage disposal in a kitchen.

(b) Discussion of Prior Art

Heretofore, hot cooking grease was poured into metal coffee cans, glass jars and other containers for storing grease, typically under a kitchen sink. This type of grease storage added a smell to a kitchen, to turning rancid over a period of time and also was subject to spillage on a kitchen floor, in a kitchen sink and inside a storage cabinet. The subject invention eliminates this type of kitchen grease storage and provides for ease in disposal.

In U.S. Pat. No. 4,930,906 to Hemphill, a cooking grease disposal bag is disclosed. The disposal bag includes an interior aluminum foil layer, an intermediate layer of polyethylene and an outer layer of paper material. The bag also includes fold lines and adhesive strips for securing the bag prior to disposal. In U.S. Pat. No. 4,555,339 to Graves et al., a cooking grease collection pot is described having a disposal inner container with grease strainer and an outer container with screw lid. In U.S. Pat. No. 6,394,313 to Wesley, a heat resistant, grease storage container is disclosed. The container is used for collecting left-over cooking oil and grease. In U.S. Pat. No. 4,008,347 to Amberg et al., a heat resistant, foamed plastic receptacle is disclosed for holding hot grease.

None of the above mentioned prior art patents described the unique features, objects, advantages and function of the subject cone shaped metal foil cooking grease container as described herein.

SUMMARY OF THE INVENTION

In view of the foregoing, it is a primary objective of the subject invention to provide a lightweight, inexpensive, metal foil cooking grease container for safely and easily collecting and disposing of hot cooking grease in a kitchen. The grease container helps eliminate pouring grease down a kitchen drain and clogging the drain's plumbing.

Another object of the invention is the grease container is cone shaped with an open top and closed bottom. The closed bottom is dimensioned and adapted for receipt inside a top of a garbage disposal in a kitchen sink. This feature allows the grease container to be held upright above the disposal when pouring grease therein.

Yet another object of the grease container is the addition of a cardboard internal sleeve used for unfolding the container into the open top and into its cone shape. Also, the grease container may include a cardboard external sleeve used for carrying the container with hot grease therein.

The subject invention includes a kitchen device in the form of a cone shaped metal foil cooking grease container with an open top, front and back sides having downwardly and inwardly sloping edges and a closed bottom. The closed bottom dimensioned for receipt inside a top of a garbage disposal for holding the container upright. A portion of the top of the back side of the container includes an upwardly extending flap, which is folded over and secured to a side of the container prior to disposing of the grease stored therein.

These and other objects of the present invention will become apparent to those familiar with different types of containers and receptacles used of receiving and holding hot grease therein and the disposal of the grease when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 3 is another perspective view of the grease container with a foldable flap on back side of the top of the grease container. The foldable flap is shown folded over and secured to a front side of the container using an adhesive strip.

FIG. 4 is a perspective view of a sealed grease container and shown being dropped into a waste basket.

FIG. 5 is a perspective view of the metal foil grease container with an internal cardboard sleeve used to unfold the container from a flat profile into a cone shape.

FIG. 6 is a perspective view of the grease container filled with hot grease and an external cardboard sleeve received therearound for ease in carrying the container prior to sealing the open top and disposal.

DETAILED DESCRIPTION OF THE PREFERRED EMBODIMENTS

Figures 1, 2:
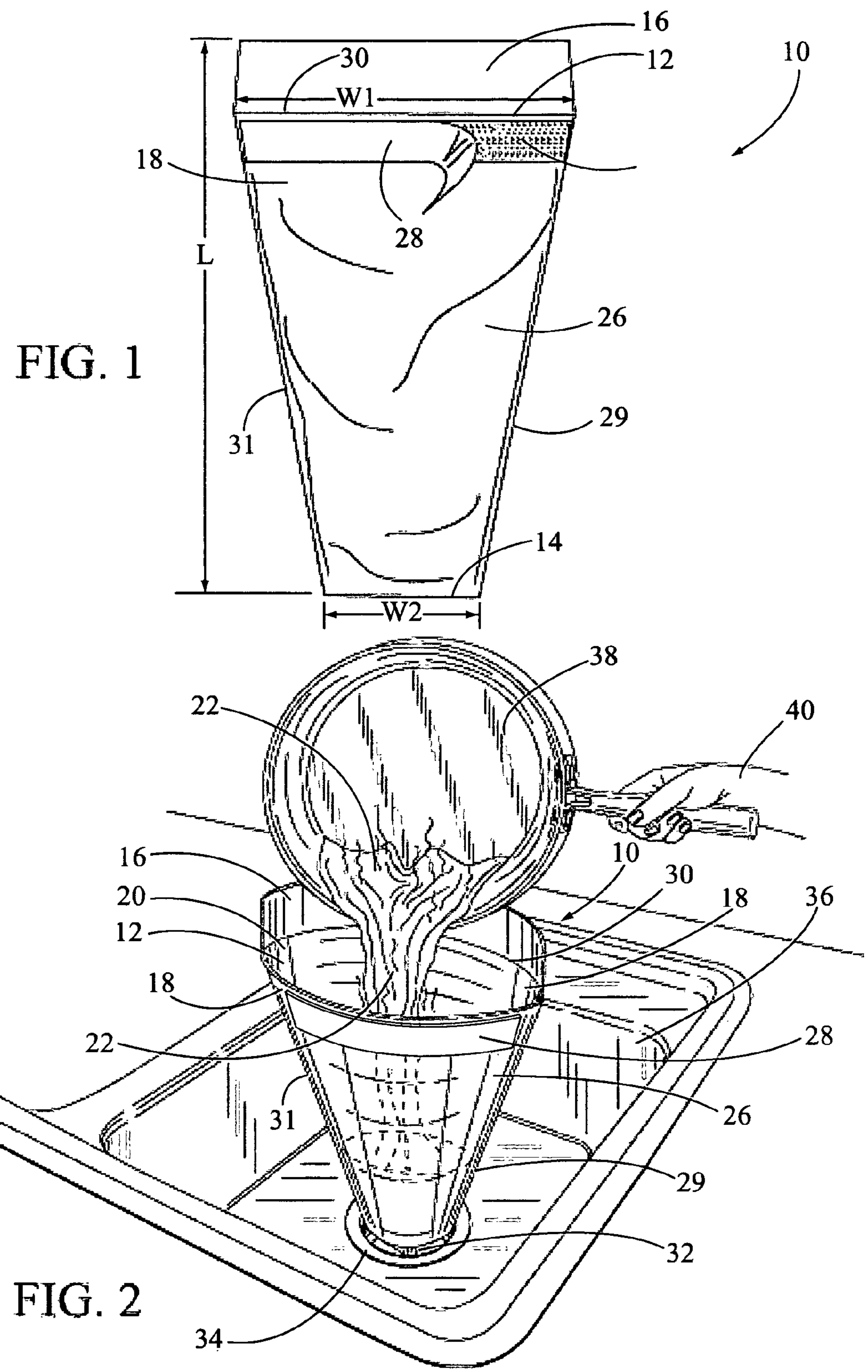
FIG. 1 is a front view of the subject metal foil grease container and prior to being unfolded into a cone shape with an open top and a closed bottom.
FIG. 2 is a perspective view of the grease container with the closed bottom received inside a top of a garbage disposal in the bottom of a kitchen sink. A cooking skillet is shown for pouring hot grease inside the grease container.

In FIG. 1, a front view of a kitchen device for collecting hot grease is shown in the form of a metal foil grease container and having general reference numeral 10. The grease container 10 is shown in this drawing prior to being unfolded from a flat profile into a cone shape. The flat profile of the container provides for ease in packaging a plurality of the containers one on top of the other for point of sale to a consumer. The grease container 10 includes an open top 12, a closed bottom 14 and a foldable flap 16 extending upwardly from a top portion 18 on a back side 20 of the container. The container 10 is made of a thin sheet metal, such as aluminum, which is ideal when receiving hot grease 22 therein. The hot grease 22 is shown in FIGS. 2 and 6.

In this drawing, an adhesive strip 24 is shown and disposed on the top portion 18 of a front side 26 of the container 10. The front side 26 and the back side 20 are identical in size and shape. The adhesive strip 24 is covered with a protective, strip cover 28. The strip cover 28 is removed when the flap 16 is folded along fold line 30 and sealed against the adhesive strip 24, as shown in FIG. 3.

The grease container 10 has a length "L" in a range of 8 to 12 inches, a width "W1" in a range of 6 to 10 inches next to the open top 12 and a width "W2" in a range of ½ to 3 inches next to the closed bottom 14. In this drawing, opposite edges 29 and 31 of the container 10 are shown tapered downwardly and inwardly from the sides of the open top 12 down to the closed bottom 14. The downwardly, sloping edges 29 and 31 and the closed bottom 14 are pressure sealed to insure that no grease can leak out of the bottom or the edges of the container when receiving and disposing of the hot grease 22.

In FIG. 2, a perspective view of the grease container 10 is shown in its unfolded, cone shape with the closed bottom 14 received inside an open top 32 of a garbage disposal 34 in a bottom of a kitchen sink 36. The diameter of a standard garbage disposal 44 is approximately 4 inches thereby allowing the closed bottom 14 to be received inside the open top of the garbage disposal and holding the container 10 upright as shown. A cooking skillet 38, held by a human hand 40, is shown pouring hot grease 22 inside the grease container 10. Obviously, the use of the container 10 is not limited to being used in conjunction with the garbage disposal in the sink.

In FIG. 3, another perspective view of the grease container 10 is shown with the foldable flap 16 on the back side 20 the grease container folded over, as indicated by arrows 42. The flap 16 is then secured to the front side 26 of the container 10 using the adhesive strip 24. In this manner, the hot grease is completely enclosed inside the container.

In FIG. 4, a perspective view of the sealed grease container 10 is shown being dropped into an open top, waste basket 44 for disposal.

In FIG. 5, a perspective view of the metal foil grease container 10 is illustrated with an internal, foldable cardboard sleeve 46, with sloping edges. The sleeve 46 is used to unfold the open top container 10, as indicated by arrows 48, from a flat profile, as shown in FIG. 1, into a cone shape for receiving the hot grease 22.

In FIG. 6, a perspective view of the grease container 10 is shown filled with hot grease 22 and an external, foldable cardboard sleeve 50, with sloping edges. The sleeve 50 is received around sides 20 and 26 and is used for ease and safety, when carrying the container 10 prior to sealing the open top 12 and prior to disposal in the waste basket 44. The sleeve 50 includes perforations 52 along its opposite sides for ease in unfolding the sleeve 50. Also, the sleeve 50 can be packaged around each of the containers and used for unfolding the flat profile container, as shown in FIG. 1, into an unfolded, cone shaped container 10 as shown in this drawing.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A kitchen device for receiving and disposing of hot cooking grease, the device comprising:

a metal foil grease container, said container having a back side, a front side, the back side and front side having downwardly and inwardly sloping edges, an open top, and a closed bottom, the closed bottom dimensioned and adapted for receipt inside an open top of a garbage disposal for holding said container upright thereon;

whereby when the back side of said container is spread apart from the front side, said container having an open top cone shape for receiving the hot grease therein; and an internal cardboard sleeve dimensioned for receipt inside said container for spreading the front side away from the back side and forming the open top cone shape.

2. A kitchen device for receiving and disposing of hot cooking grease, the device comprising:

a metal foil grease container, said container having a back side, a front side, the back side and front side having downwardly and inwardly sloping edges, an open top, and a closed bottom, the closed bottom dimensioned and adapted for receipt inside an open top of a garbage disposal for holding said container upright thereon;

whereby when the back side of said container is spread apart from the front side, said container having an open top cone shape for receiving the hot grease therein; and an external cardboard sleeve dimensioned for receipt around the front side and back side of said container when said container is in a flat profile and unfolded into the open top cone shape and for holding said container when hot grease is poured therein.

3. A kitchen device for receiving and disposing of hot cooking grease, the device comprising:

a metal foil grease container, said container having a back side received on top of a front side when said container in an unfolded, flat profile, the back side and front side identical in size and shape and having downwardly and inwardly sloping edges, an open top, and a closed bottom, the edges and closed bottom pressure sealed, the closed bottom dimensioned and adapted for receipt inside an open top of a garbage disposal for holding said container upright thereon;

whereby when the back side of said container is spread apart from the front side, said container having an open top cone shape for receiving the hot grease therein; and an internal, foldable cardboard sleeve dimensioned for receipt inside said container for spreading the front side away from the back side and forming an open top cone shape.

4. A kitchen device for receiving and disposing of hot cooking grease, the device comprising:

a metal foil grease container, said container having a back side received on top of a front side when said container in an unfolded, flat profile, the back side and front side identical in size and shape and having downwardly and inwardly sloping edges, an open top, and a closed bottom, the edges and closed bottom pressure sealed, the closed bottom dimensioned and adapted for receipt inside an open top of a garbage disposal for holding said container upright thereon;

whereby when the back side of said container is spread apart from the front side, said container having an open top cone shape for receiving the hot grease therein; and an external, foldable cardboard sleeve dimensioned for receipt around the front side and back side of said container when said container is in a flat profile and when said container is formed into a cone shape and for holding said container when hot grease is poured therein.

5. A kitchen device for receiving and disposing of hot cooking grease, the device comprising:

a metal foil grease container, said container having a back side received on top of a front side when said container in an unfolded, flat profile, the back side and front side identical in size and shape and having downwardly and inwardly sloping edges, a top of the back side and front side having a width in a range of 6 to 10 inches, the back side and front side having a length in a range of 8 to 12 inches, an open top, and a closed bottom, the closed bottom having a width in a range of ½ to 3 inches, the edges and closed bottom pressure sealed, the closed bottom dimensioned and adapted for receipt inside an open top of a garbage disposal for holding said container upright thereon;

a foldable flap extending upwardly from a top of the back side of said container, said flap including a fold line for folding said flap over onto the front side of said container for sealing said container prior to disposing of the grease;

whereby when the back side of said container is spread apart from the front side, said container having an open top cone shape for receiving the hot grease therein; and an internal, foldable cardboard sleeve with sloping edges, said internal sleeve dimensioned for receipt inside said container for spreading the front side away from the back side and forming an open top cone shape.

6. A kitchen device for receiving and disposing of hot cooking grease, the device comprising:

a metal foil grease container, said container having a back side received on top of a front side when said container in an unfolded, flat profile, the back side and front side identical in size and shape and having downwardly and inwardly sloping edges, a top of the back side and front side having a width in a range of 6 to 10 inches, the back side and front side having a length in a range of 8 to 12 inches, an open top, and a closed bottom, the closed bottom having a width in a range of ½ to 3 inches, the edges and closed bottom pressure sealed, the closed bottom dimensioned and adapted for receipt inside an open top of a garbage disposal for holding said container upright thereon;

a foldable flap extending upwardly from a top of the back side of said container, said flap including a fold line for folding said flap over onto the front side of said container for sealing said container prior to disposing of the grease;

whereby when the back side of said container is spread apart from the front side, said container having an open top cone shape for receiving the hot grease therein; and an external, foldable cardboard sleeve with sloping edges and perforations along opposite sides of said sleeve, said external sleeve dimensioned for receipt around the front side and back side of said container when said container is in a flat profile and when said container is formed into an open top cone shape and for holding said container when hot grease is poured therein.

* * * * *